United States Patent
Jain et al.

(10) Patent No.: US 12,288,549 B2
(45) Date of Patent: Apr. 29, 2025

(54) SPOKEN QUERY PROCESSING FOR IMAGE SEARCH

(71) Applicant: Adobe Inc., San Jose, CA (US)

(72) Inventors: Ajay Jain, San Jose, CA (US); Sanjeev Tagra, Redmond, WA (US); Sachin Soni, New Delhi (IN); Ryan Rozich, Austin, TX (US); Nikaash Puri, New Delhi (IN); Jonathan Roeder, San Jose, CA (US)

(73) Assignee: adobe inc., San Jose, CA (US)

( * ) Notice: Subject to any disclaimer, the term of this patent is extended or adjusted under 35 U.S.C. 154(b) by 334 days.

(21) Appl. No.: 17/887,959

(22) Filed: Aug. 15, 2022

(65) Prior Publication Data
US 2024/0054991 A1   Feb. 15, 2024

(51) Int. Cl.
| | | |
|---|---|---|
| *G10L 15/06* | (2013.01) | |
| *G06F 3/16* | (2006.01) | |
| *G06F 16/532* | (2019.01) | |
| *G06F 40/284* | (2020.01) | |
| *G06F 40/30* | (2020.01) | |
| *G06V 10/774* | (2022.01) | |
| *G10L 15/183* | (2013.01) | |
| *G10L 15/22* | (2006.01) | |

(52) U.S. Cl.
CPC ............ *G10L 15/063* (2013.01); *G06F 3/167* (2013.01); *G06F 16/532* (2019.01); *G06F 40/284* (2020.01); *G06F 40/30* (2020.01); *G06V 10/7747* (2022.01); *G10L 15/183* (2013.01); *G10L 15/22* (2013.01)

(58) Field of Classification Search
CPC ....... G10L 15/063; G06F 40/284; G06F 40/30
See application file for complete search history.

(56) References Cited

U.S. PATENT DOCUMENTS

2022/0130499 A1\* 4/2022 Zhou ..................... G06V 10/25

\* cited by examiner

*Primary Examiner* — Ibrahim Siddo
(74) *Attorney, Agent, or Firm* — Shook Hardy & Bacon LLP

(57) ABSTRACT

An image search system uses a multi-modal model to determine relevance of images to a spoken query. The multi-modal model includes a spoken language model that extracts features from spoken query and a language processing model that extract features from an image. The multi-model model determines a relevance score for the image and the spoken query based on the extracted features. The multi-modal model is trained using a curriculum approach that includes training the spoken language model using audio data. Subsequently, a training dataset comprising a plurality of spoken queries and one or more images associated with each spoken query is used to jointly train the spoken language model and an image processing model to provide a trained multi-modal model.

19 Claims, 8 Drawing Sheets

| IMAGE | RELEVANCE SCORE |
|---|---|
| 302  | 0.95 |
| 304  | 0.93 |
| 306  | 0.20 |

SPOKEN QUERY PROCESSING FOR IMAGE SEARCH

BACKGROUND

Search engines facilitate identifying and returning relevant items from electronic databases, such as, for instance, databases of images or products. Generally, search engines receive search queries from users and provide search results for items that are responsive to the search queries. For a given search query, a search engine processes the search query, as well as other parameters (e.g., user data, contextual data, and/or other inputs), to identify the most relevant items for the particular search query. Search results for identified items can be presented on a user device in several different forms via a search results user interface.

SUMMARY

Some aspects of the present technology relate to, among other things, an image search system that employs a multi-modal model to determine relevance of images to spoken queries. The multi-modal model includes a spoken language model and a language processing model. Given a spoken query and an input image, the spoken language model extracts features from the speech signal of the spoken query, while the language processing model extracts features from the image. The multi-model model determines a relevance score for the image and the spoken query based on the extracted features.

In some aspects, the multi-modal model is trained using a curriculum approach. The spoken language model is initially trained on audio data to learn acoustic and linguistic features from the speech signals of spoken queries. After the initial training of the spoken language model, the spoken language model and image processing model are jointly trained on a training dataset that comprises a plurality of spoken queries and one or more images associated with each spoken query; thereby providing a trained multi-modal model.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
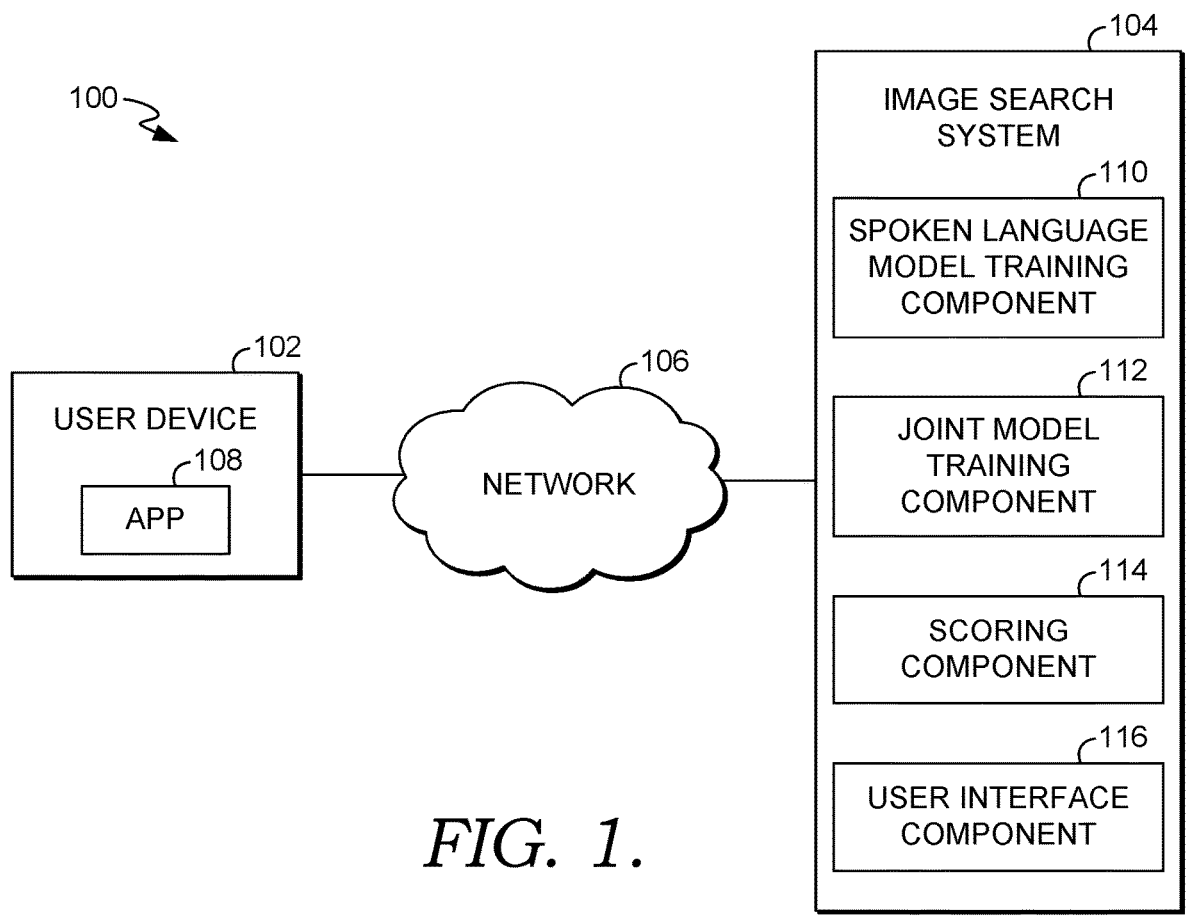
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "multi-modal model" refers to a machine learning model that operates on at least two modalities. In accordance with some aspects of the technology described herein, a multi-modal model operates on two modalities, a spoken query and an image, to generate a relevance score reflecting a relevance of the image to the spoken query.

A "spoken language model" is a component of a multi-modal model in accordance with some aspects of the technology described herein that extracts acoustic and linguistic features from a spoken query. In some configurations, the spoken language model includes one or more neural networks, as described in further detail below.

An "image processing model" is a component of a multi-modal model in accordance with some aspects of the technology described herein that extracts visual features from an input image. In some configurations, the image processing model includes one or more neural networks, as described in further detail below.

The term "spoken query" refers to a search query uttered by a user. A spoken query comprises a speech signal as opposed to text generated from speech. In some aspects, a "speech signal" is a spectrum of frequencies, such as a spectrogram.

As used herein, a "token" refers to a representation of an n-gram (e.g., a single word or multi-word phrase) extracted from a speech signal by the spoken language model.

A "training dataset" refers to data used to train a model. In accordance with some aspects of the technology described herein, a training dataset includes a plurality of spoken queries and one or more images associated with each spoken query. The spoken queries can be obtained, for instance, from queries submitted by users to a search system. In some aspects, an image associated with a spoken query in a training data set is either a positive example or a negative example.

A "positive example" comprises an image that is relevant to a spoken query (e.g., target relevance score of 1). In some instances, a positive example is identified from historical search sessions and comprises an image associated with a search result with which a user interacted (e.g., selected, viewed, purchased, etc.) in response to a spoken query.

A "negative example" comprises an image that is not relevant to a spoken query (e.g., target relevance score of 0). In some instances, a negative example is an image not associated with a search result with which a user interacted in response to a spoken query.

Overview

While search engines are incredibly useful tools for locating items, shortcomings in existing search technologies often result in the consumption of an unnecessary quantity of computing resources (e.g., I/O costs, network packet generation costs, throughput, memory consumption, etc.). Image search is one particular area that presents challenges. Image search involves identifying images in response to search queries. This includes identifying images from an image database or identifying products via product images in a product database. When performing image searches, users are often seeking items with particular characteristics. Many conventional search engines perform searches using text-based or voice-based search queries submitted by users. However, it is often difficult for users to craft search queries that adequately capture desired features of items they are seeking. Some conventional search engines enable image-query search in which users can enter an image as a search query to identify similar items. This approach is also often insufficient because users are typically unable to find images of items with the exact characteristics desired by the users. Some search systems provide tools that allow users to filter items based on certain characteristics. For instance, product platforms often allow users to filter products. However, the available filters are often limited in scope and don't capture all characteristics that users are seeking.

As a result of shortcomings of conventional image search systems, users often have to submit multiple search queries before finding desired items. For example, a user may issue a first search query to a search engine that returns a set of search results. The user may browse the search results and select certain search results to access the corresponding items. Selection of items causes retrieval of the items from various content sources. Additionally, in some cases, applications supporting those items are launched in order to render the items. Often, the search results returned by the search engine don't satisfy the user's goal, requiring the user to spend more time on the search process by repeating the process of issuing additional search queries and selecting certain search results until the user finally accesses a desired item or, in some cases, the user gives up because the search engine was not above to return desired search results even after multiple searches.

These repetitive inputs result in increased computing resource consumption, among other things. For instance, repetitive search queries result in packet generation costs that adversely affect computer network communications. Each time a user issues a search query, the contents or payload of the search query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue search queries, it is expensive because processing search queries consumes a lot of computing resources. For example, for some search engines, a query execution plan may need to be calculated each time a search query is issued, which requires a search system to find the least expensive query execution plan to fully execute the search query. This decreases throughput and increases network latency, and can waste valuable time.

Aspects of the technology described herein improve the functioning of the computer itself in light of these shortcomings in existing search technologies by providing an image search system that determines relevance of images to spoken queries submitted by users using a multi-modal model. More particularly, the image search system generates relevance scores for images given a spoken query using a multi-modal model that includes a spoken language model and an image processing model. The spoken language model extracts features from a spoken query, while the image processing model extracts features from an image. The multi-modal modal generates a relevance score from the extracted features. The relevance score reflects a relevance of the image to the spoken query. Search results are returned in response to a spoken query based at least in part on the relevance scores determined for different images and the spoken query by the multi-modal model.

In accordance with some aspects of the technology described herein, the multi-modal model is trained using a curriculum approach. The curriculum approach includes initially training the spoken language model on audio data to extract features from the audio data. Subsequently, the spoken language model and the image processing model are jointly trained on training data to generate relevance scores that reflect a relevance of images to spoken queries.

The training data used to jointly train the spoken language model and the image processing model comprises a collection of spoken queries and one or more images associated with each spoken query. In some aspects, each image associated with a spoken query in the training data comprises a positive example (i.e., an image relevant to the spoken query) and a negative image (i.e., an image not relevant to the spoken query). For instance, in some configurations, the training data comprises historical search information including spoken queries submitted by users to a search system. In such configurations, a positive example for a spoken query comprises an image associated with a search result with which the user interacted in response to the spoken query, while a negative example for the spoken query comprises an image not associated with a search result with which the user interacted in response to the spoken query.

In some aspects of the technology describe herein, the spoken language model comprises a sequence of models. For instance, in some configurations, the spoken language model includes a first model that is trained to generate sequences of representations of characters from a speech signal of a spoken query, and a second model that is trained to generate tokens from the sequences of representations of characters from the first model. As such, the first and second models together learn acoustic and language features of the speech signals of spoken queries. The spoken language model can further include a third model that is trained to generate semantic information from the tokens from the second model. In such configurations, the three models together extract semantic information from the speech signals of spoken queries. The sequence of models of the spoken language model can be trained using a curriculum approach in which at least one model is initially trained followed by adding and training another model.

Aspects of the technology described herein provide a number of improvements over existing search technologies. For instance, the technology described herein uses spoken queries and images directly for determining relevance, which provides improved results over a conventional pipeline approach that first converts voice to text and then uses the text as a query. Using the speech signals of spoken queries as the input to the multi-modal architecture provides an advantage of understanding acoustic features (e.g., pitch, tone, sentiments, etc.) and at the same time leveraging visual features from the image. In contrast, the speech to text component of some conventional approaches operates without knowledge of the semantic information in the sentence. Additionally, the technology described herein uses a single multi-modal model that is optimized on the overall task at hand, in contrast to conventional approaches that use acoustic, pronunciation, speaker adaptation, and/or language model components that are separately trained and individually optimized for smaller subtasks. Conventional approaches also typically propagate errors in separate components to the main task. In contrast, optimizing the multi-modal model on the overall task improves the overall accuracy of the system. Some previous approaches operate on a single voice command and image and does not take good account of context. In contrast, some configurations employ a transformer that helps the multi-modal model with the attention of previously predicted tokens for the predictions of new tokens. Thus, the multi-modal model makes better contextual decisions.

The technology described herein provides for data efficiency that stems from using a curriculum learning methodology. As a result, a system using the technology described herein provides competitive results on automatic speech recognition and semantic tagging tasks while using 9 to 12 times less data compared to other models. For instance, an example model was trained using aspects of the technology described herein on 41.5 hours of speech, while other models use 300 to 500 hours speech. For the task of semantic tagging, an example model was trained using the technology described herein on an even smaller set of 16.8 hours, providing similar results to models using 300 hrs of data.

The technology described herein is also language agnostic. The approach works with little to no modifications for multiple languages (e.g., English, French, Spanish, etc.) as there is no need to use a special pre-trained language model. Also, rather than using phonemes, the technology described herein uses characters as the basic unit of training which makes the dictionary pronunciation free.

The technology described herein further provides computational efficiency. An example model built using the technology provides comparative results using 9.8 M parameters in contrast to 97 M parameters in other models. This computational efficiency is particularly relevant when deploying such models to mobile devices.

Additionally, computing resource consumption is improved relative to existing technologies. In particular, searching using the multi-modal model described herein enables the search engine to return search results that match a user intent, thereby allowing the user to more quickly access relevant search results. The search engine enables the user to quickly find items with visual characteristics that matches the user's intent. This eliminates (or at least reduces) the repetitive search queries, search result selections, and rendering of items because the search results comprise items with characteristics that correspond to what the user is seeking. Accordingly, aspects of the technology described herein decrease computing resource consumption, such as packet generation costs. For instance, a search query (e.g., an HTTP request), would only need to traverse a computer network once (or fewer times relative to existing technologies). Specifically, the contents or payload of the search query is supplemented with header information or other metadata within a packet in TCP/IP and other protocol networks once for the initial user query. Such packet for a search query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of search results from existing search technologies results in repetitive search queries, search result selections, and item renderings. This causes multiple traversals to disk. In contrast, aspects described herein reduce storage device I/O because the user provides only minimal inputs and so the computing system does not have to reach out to the storage device as often to perform a read or write operation. For example, the search engine can respond with search results that satisfy the user intent from a single search query (or few queries relative to existing technology). Accordingly, there is not as much wear on components, such as a read/write head, because disk I/O is substantially reduced.

Various configurations also improve query execution resource savings. Specifically, for example, the search system calculates a query execution plan on fewer search queries relative to existing search technologies. This increases throughput and decreases network latency because aspects of the technology described herein do not have to repetitively calculate query execution plans because fewer search queries need to be executed, unlike existing search technologies.

Example System for Spoken Query Image Search

With reference now to the drawings, FIG. 1 is a block diagram illustrating an exemplary system 100 for performing image search using spoken queries in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image search system 104. Each of the user device 102 and image search system 104 shown in FIG. 1 can comprise one or more computer devices, such as the computing device 800 of FIG. 8, discussed below. As shown in FIG. 1, the user device 102 and the image search system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image search system 104 could be provided by multiple server devices collectively providing the functionality of the image search system 104 as described herein. Additionally, other components not shown can also be included within the network environment.

The user device 102 can be a client device on the client-side of operating environment 100, while the image search system 104 can be on the server-side of operating environment 100. The image search system 104 can comprise server-side software designed to work in conjunction with client-side software on the user device 102 so as to implement any combination of the features and functionalities discussed in the present disclosure. For instance, the user device 102 can include an application 108 for interacting with the image search system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the image search system 104 remain as separate entities. While the operating environment 100 illustrates a configuration in a networked environment with a separate user device and image search system, it should be understood that other configurations can be employed in which components are combined. For instance, in some configurations, a user device can also provide image search capabilities.

The user device 102 comprises any type of computing device capable of use by a user. For example, in one aspect, the user device comprises the type of computing device 800 described in relation to FIG. 8 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the image search system 104 via the user device 102.

Figure 2:
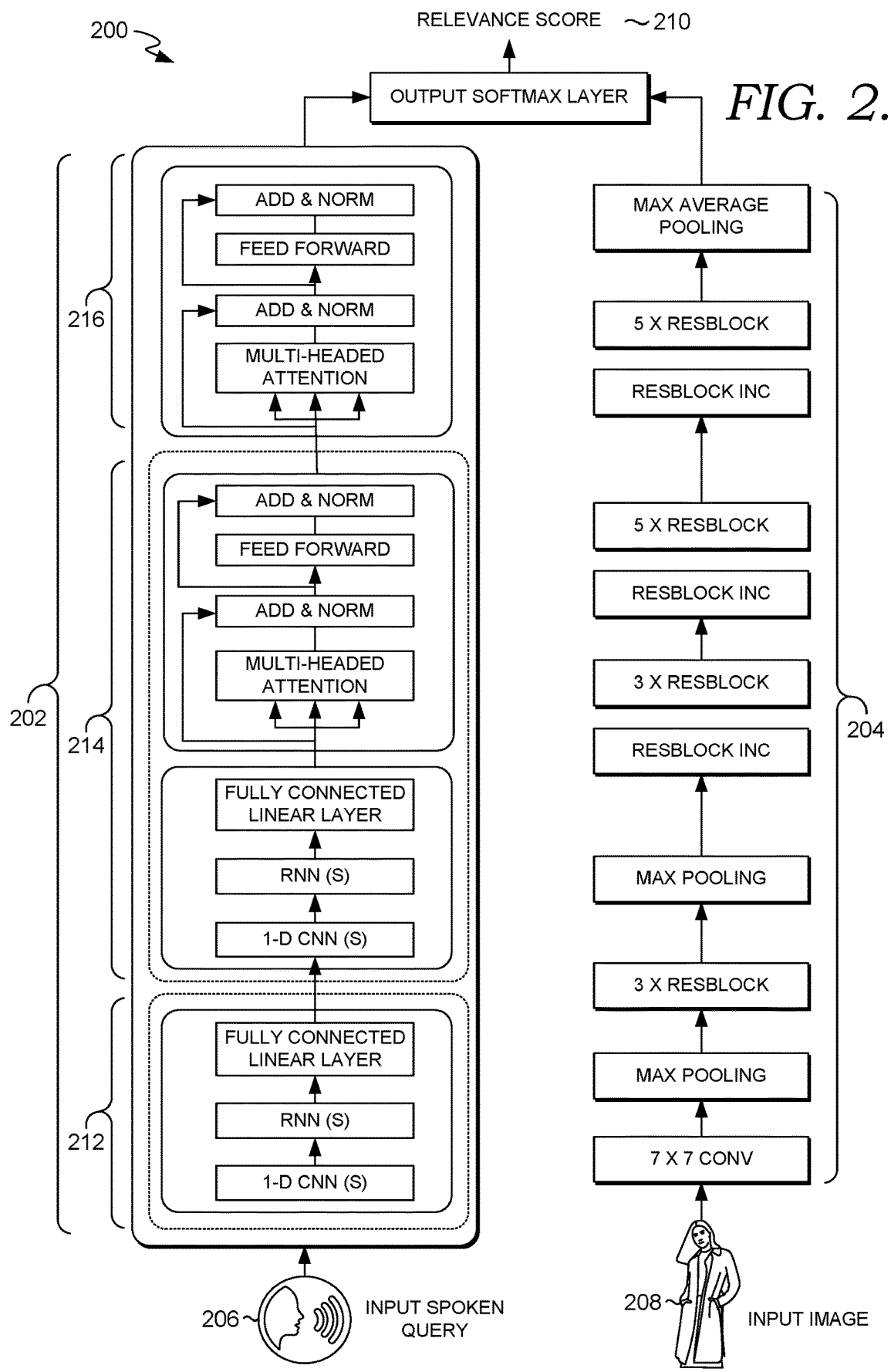
FIG. 2 is a diagram showing an example multi-modal model comprising a spoken language model and an image processing model in accordance with some implementations of the present disclosure.

At a high level, the image search system 104 processes spoken queries (e.g., a spoken query received from a user associated with the user device 102) to generate relevance scores for images and return search results based on the relevance scores. The image search system 104 generates relevance scores using a multi-modal model that includes a spoken language model and image processing model. Each model can comprise, for instance, one or more neural networks. By way of example only and not limitation, FIG. 2 illustrates an architecture for a multi-modal model 200 that includes a spoken language model 202 and an image processing model 204 that can be used by the image search system 104 in some configurations. The spoken language model 202 extracts features from input spoken queries, such as the input spoken query 206, while the image processing model 204 extracts features from images, such as the input image 208. As will be described in further detail below, the spoken language model 202 and image processing model 204 are trained using a curriculum approach in which the spoken language model 204 is initially trained to extract features from audio data and then the spoken language model 204 and the image processing model 206 are jointly trained to generate relevance scores that reflect a relevance of images to spoken queries. For instance, FIG. 2 illustrates a relevance score 210 being generated by the multi-modal model 200 that represents a relevance of the input image 208 to the input spoken query 206.

Returning to FIG. 1, the image search system 104 includes a spoke language model training component 110, a joint model training component 112, a scoring component 114, and a user interface component 116. The components of the image search system 104 can be in addition to other components that provide further additional functions beyond the features described herein. The image search system 104 can be implemented using one or more server devices, one or more platforms with corresponding application programming interfaces, cloud infrastructure, and the like. While the image search system 104 is shown separate from the user device 102 in the configuration of FIG. 1, it should be understood that in other configurations, some or all of the functions of the image search system 104 can be provided on the user device 102.

In one aspect, the functions performed by components of the image search system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image search system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The spoken language model training component 110 of the image search system 104 trains a spoken language model to extract features from spoken language, such as spoken queries from users. The spoken language processed by the spoken language model comprises a speech signal as opposed to text (e.g., text generated from speech). For instance, the speech signal can comprise a spectrum of frequencies such as a spectrogram. The spoken language model is trained by the spoken language model training component 110 to extract features from the speech signal.

In some aspects, the spoken language model uses sequence-to-sequence neural models that jointly learn acoustic and linguistic features at multiple stages. By way of example only and not limitation, FIG. 2 illustrates a spoken language model 202 that includes a sequence of three models, a basic model 212, a sequential model 214, and a semantic model 216.

The basic model 212 is trained by the spoken language model training component 110 on a speech signal (e.g., a spectrogram) to generate sequences of representations of characters. As such, the basic model 212 is trained to learn the acoustic features of the speech signal. The basic model 212 shown in FIG. 2 comprises an encoder architecture including a stack of convolutional and recurrent layers. However, it should be understood that other network architectures can be employed within the scope of embodiments of the technology described herein.

The sequential model 214 is trained by the spoken language model training component 110 to learn tokens from the sequences of representations of characters from the basic model 212. As such, the basic model 212 and sequential model 214 together learn both acoustic and language features of the speech signal. The sequential model 214 shown in FIG. 2 comprises a stack of convolutional and recurrent layers along with a transformer unit as a decoder. However, it should be understood that other network architectures can be employed within the scope of embodiments of the technology described herein.

The semantic model 216 is trained by the spoken language model training component 110 to learn semantic information from the tokens from the sequential model 214. As such, the basic model 212, the sequential model 214, semantic model 216 together extract semantic information from a speech signal. The semantic model 216 shown in FIG. 2 comprises a transformer. However, it should be understood that other network architectures can be employed within the scope of embodiments of the technology described herein.

While the spoken language model 206 of FIG. 2 is shown with a sequence of three models, it should be understood that various embodiments of the technology described herein can employ a spoken language model with any number of models. For instance, in some configurations, the spoken language model includes only a basic model (such as the basic model 212) and a sequential model (such as the sequential model 214) without a semantic model (such as the semantic model 216). In such configurations, the spoken language model learns the acoustic and linguistic features of a speech signal and those features are used by the multi-modal model to generate a relevance score.

The spoken language model training component 110 trains a spoken language model over a number of epochs using audio data comprising speech signals. At each epoch, parameters (e.g., weights) of the spoken language model are updated. In some configurations in which the spoken language model includes a sequence of models, the spoken language model training component 110 trains the models using a curriculum process in which at least one model is trained before another model is trained. In particular, after a first model has been trained, a second model is added to the first model to train the second model given output of the trained first model. In some instances, parameters of the first model are fixed while training the second model. In other instances, parameters of the first model are updated while training the second model (i.e., the first model is retrained while training the second model).

By way of example only and not limitation, one curriculum approach for training the three models of the spoken language model 202 of FIG. 2 includes a first training stage that includes training the basic model 212 to learn sequences of representations of characters from speech signals. In a second training stage, the sequential model 214 is stacked on top of the basic model 212 (with parameters of the basic model 212 initialized based on the first training stage), and the sequential model 214 is trained to learn tokens from sequences of representations of characters from the basic model 212. The parameters of the basic model 212 can be fixed or updated while training the sequential model 214. In a third training stage, the semantic model 216 is then stacked on top of the basic model 212 (with parameters of the basic model 212 initialized based on the first and/or second training stage) and the sequential model 214 (with parameters of the sequential model 214 initialized based on the second training stage), and the semantic model 216 is trained to learn semantic information from the tokens from the sequential model 214. The parameters of each of the basic model 212 and the sequential model 214 can be fixed or updated while training the semantic model 216. While the approach of the current example trains each model of the spoken language model 202 individually in three stages, other approaches can be used. For instance, the basic model 212 and the sequential model 214 could be jointly trained in a first stage, and the semantic model 216 trained in a subsequent stage. As another example, the basic model 212 could be trained in a first stage followed by jointly training the sequential model 214 and the semantic model 216 in a subsequent stage. Any and all such configurations are contemplated to be within the scope of embodiments of the present technology.

Returning to FIG. 1, the joint model training component 112 of the image search system jointly trains a spoken language model (initially trained by the spoken language model training component 110) and an image processing model. For instance, with reference again to FIG. 2, after the spoken language model training component 110 trains the spoken language model 202, the joint model training component 112 jointly trains the spoken language model 202 and the image processing model 204. The image processing model 204 of FIG. 2 comprises a convolutional neural network (CNN) architecture. For instance, the ResNet-50 architecture could be employed. However, it should be understood that other network architectures can be employed within the scope of embodiments of the technology described herein. The image processing model 204 can be initialized with random parameters, while the spoken language model 202 is initialized with parameters learned from training by the spoken language model training component 110. During training, the parameters of the spoken language model 202 and the image processing model 204 are updated.

The joint model training component 112 jointly trains the spoken language model 202 and the image processing model 204 using training data that includes spoken query and image pairs. Each pair comprises a spoken query and an image. In some aspects, each image associated with a spoken query can comprise a positive example or a negative example. A positive example comprises an image that is relevant to the spoken query (e.g., target relevance score of 1). A negative example comprises an image that is not relevant to the spoken query (e.g., target relevance score of 0).

In some embodiments, the training data is based at least in part on historical search information (e.g., from query logs). The historical search information includes spoken queries previously submitted by users to a search system and images associated with search results with which users interacted in response to the spoken queries (e.g., selected a search result, viewed an item, purchased an item, etc.). Each spoken query comprises a speech signal and not text. As such, a training pair can include a spoken query submitted by a user and an image associated with a search result with which the user interacted. This is considered a positive example herein as the pair represents an image that should be associated with the spoken query based on the user interaction.

In some configurations, negative examples are also used to jointly train the spoken language model 204 and the image processing model 204. In the context of using historical search information, a negative example comprises a spoken query submitted by a user and an image not associated with a search result with which the user interacted. In some instances, an image associated with a search result provided in response to the spoken query but not interacted with by the user is used. In other instances, an image is sampled from a collection of images and used for the negative example. The image can be selected from a category associated with a positive example image for the spoken query or a category otherwise associated with the spoken query.

By way of example for illustration purposes, if the user says "show me a bedsheet with red roses" and clicks on a specific product in a set of search results, then the speech signal for this spoken query along with the image of the clicked product is used as a positive example (e.g., target relevance score=1) when jointly training the spoken language model 202 and the image processing model 204. Additionally, for this spoken query, same-category images from the database are randomly sampled. These same-category images correspond to products that the user did not click on. Therefore, the speech signal for the spoken query along with these images are used as negative examples (target relevance score=0) when jointly training the spoken language model 202 and the image processing model 204.

As shown in FIG. 2, the multi-modal model 200 includes an output layer that generates a relevance score based on representations from the spoken language model 202 and the image processing model 204. The multi-modal model 200 is trained over a number of epochs in which at each epoch, a training pair (positive or negative example) is provided as input. During each epoch, a spoken query (e.g., the input spoken query 206) is provided as input to the spoken language model 202, and a corresponding image (e.g., the input image 208) is provided as input to the image processing model 204. The spoken language model 202 extracts features from the spoken query and the image processing model 204 extracts features from the image. Those features are provided to the output layer to predict a relevance score (e.g., the relevance score 210), and the parameters of the spoken language model 202 and the image processing model 204 are updated (e.g., using backpropagation).

In some configurations, the joint model training component 112 of FIG. 1 jointly trains a spoken language model and image processing model by ordering spoken queries in the training dataset based on increasing length of the spoken queries. The spoken queries are introduced to the spoken language model and image processing model to train the models based on the order. As such, shorter spoken queries, which are simpler sequential structures, are used to train the models first followed by longer spoken queries. In further configurations, a length threshold is used in which the spoken language model and the image processing model are trained over a number of epochs using spoken queries having a length below a length threshold and subsequently trained over a number of epochs using spoken queries having a length above the length threshold. In some configuration, multiple different length thresholds are employed.

Once a spoken language model and image processing model of a multi-modal model have been jointly trained by the joint model training component 112, the scoring component 114 generates relevance scores for images to spoken queries submitted by users. In particular, when a spoken query is submitted by a user, the speech signal of the spoken query (not text or a text equivalent to the speech signal) is provided as input to the spoken language model of the multi-modal model. Additionally, an image from a database (e.g., an image repository) is provided as input to the image processing model of the multi-modal model. Given these inputs, the spoken language model extracts features from the speech signal of the spoken query, the image processing model extracts features from the image, and the multi-modal model predicts a relevance score based on those extracted features. For instance, FIG. 2 shows a relevance score 210 predicted by the multi-modal model given the input spoken query 206 and the input image 208. The relevance score 210 reflects a relevance of the input image 208 to the input spoken query 206.

The image scoring component 114 can generate a relevance for each of any number of images for a given spoken query to provide a relevance score for each image reflecting a relevance of each image to the spoken query. In some cases, the scoring component 114 generates a relevance score for each image in a database. In other cases, the scoring component 114 generates a relevance score for a subset of images from a database. For instance, images from a given category can be scored. As an example to illustrate, if a user is browsing a particular category of products, then scoring can be performed only for images of products in that category. This reduces latency when performing inference on the multi-modal model.

One or more search results are returned in response to the spoken query based at least in part on the relevance scores. This can include selecting (i.e., the top k images) and/or ranking (i.e., ordering) search results using the relevance scores. In some instances, the search results include only the images, while in other instances, the search results include other information associated with the images (e.g., product identification information in the context of a listing platform listing products). It should be understood that the relevance scores from the multi-modal model can be used in conjunction with other search signals (e.g., text-based relevance, user preferences, previous user queries and/or user selections from the current search session or previous search sessions, etc.).

Figure 3:
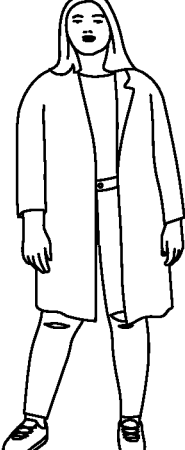
FIG. 3 is a diagram illustrating relevance scores provided for images based on spoken query in accordance with some implementations of the present disclosure.
Figure 3:
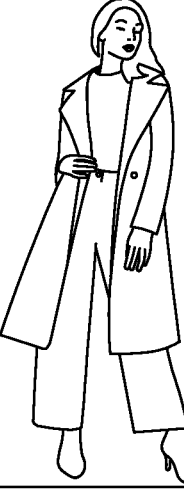
Figure 3:
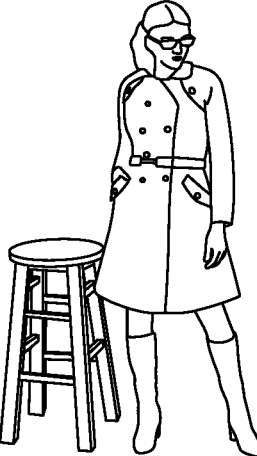

By way of example, FIG. 3 illustrates relevance scores determined using a multi-modal model in accordance with aspects of the technology described herein. In the example of FIG. 3, a user has submitted a spoken query: "show me trench coats which are open from the front", and the multi-modal model has determined a relevance score for each of three images 302, 304, and 306. As shown, the image 302 and the image 304 each include a model wearing a trench coat in which the trench coat is open in the front. The multi-modal model has predicted relatively higher relevance scores of 0.95 and 0.93 for the image 302 and the image 304, respectively. This reflects a higher relevance of the images 302 and 304 to the spoken query. In contrast, the image 306 includes a model wearing a trench coat that is not open in the front. In this case, the multi-modal model has predicted a relatively lower relevance score of 0.2. This reflects a lower relevance of the image 306 to the spoken query.

Returning to FIG. 1, the user interface component 116 of the image search system 104 provides one or more user interfaces for interacting with the image search system 104. For instance, the user interface component 116 can provide user interfaces to a user device, such as the user device 102. Among other things, the user interfaces provided by the user interface component 116 can enable a user to submit a spoken query to the image search system 104, which generates relevance scores for images based on the spoken query (e.g., using the scoring component 114, as described above). The user interface component 116 also provides one or more user interfaces to a user device, such as the user device 102, that present search results in response to the spoken query based at least in on the relevance scores.

Figure 4:
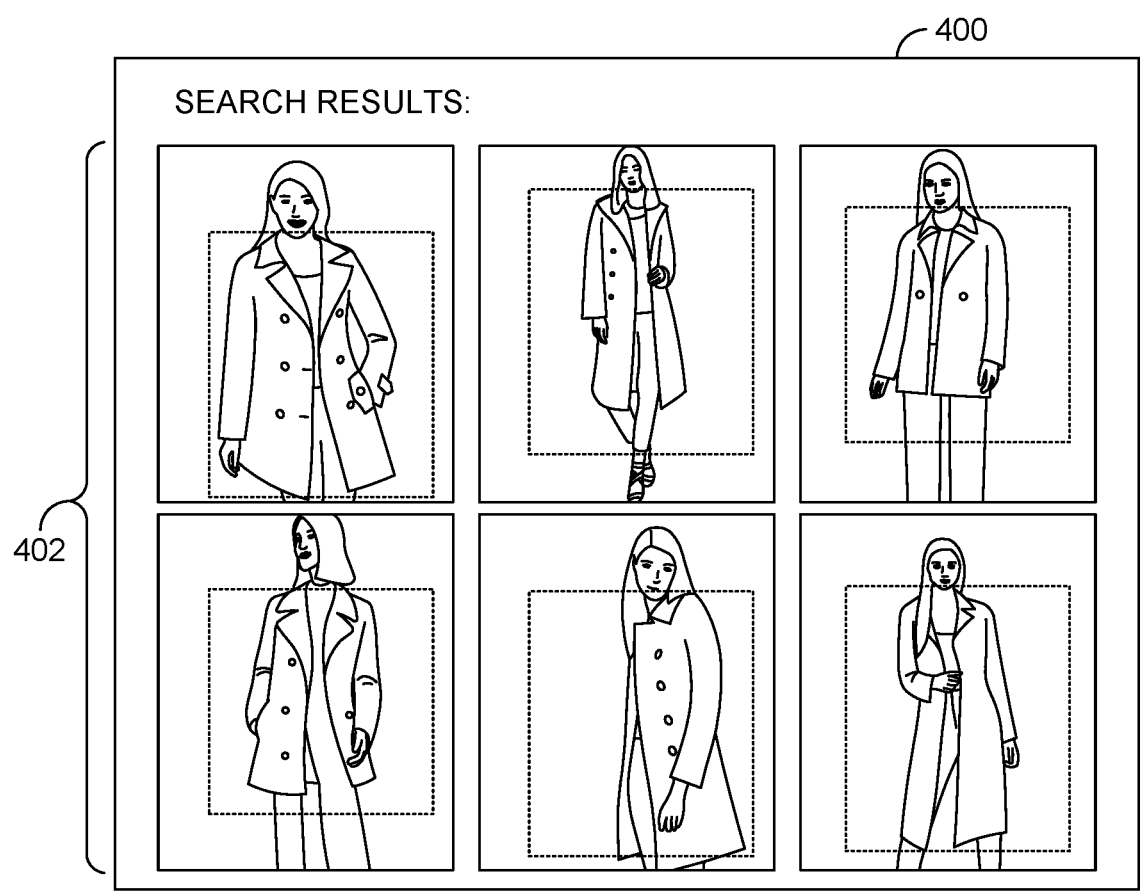
FIG. 4 is a diagram illustrating image search results provided in response to a spoken query in accordance with some implementations of the present disclosure.

FIG. 4 illustrates an example of a user interface 400 providing search result images 402 provided in response to a spoken query: "show me trench coats with front open." The search result images 402 are selected based on relevance scores determined by the multi-modal model. In this example, each of the search result images 402 show a model wearing a trench coat with the front open. This illustrates the ability of the multi-modal model to identify images and provide search results that are relevant to a visual feature (e.g., front open) included in the spoken query that is not otherwise provided in text or metadata associated with the images.

Example Methods for Spoken Query Image Search

Figure 5:
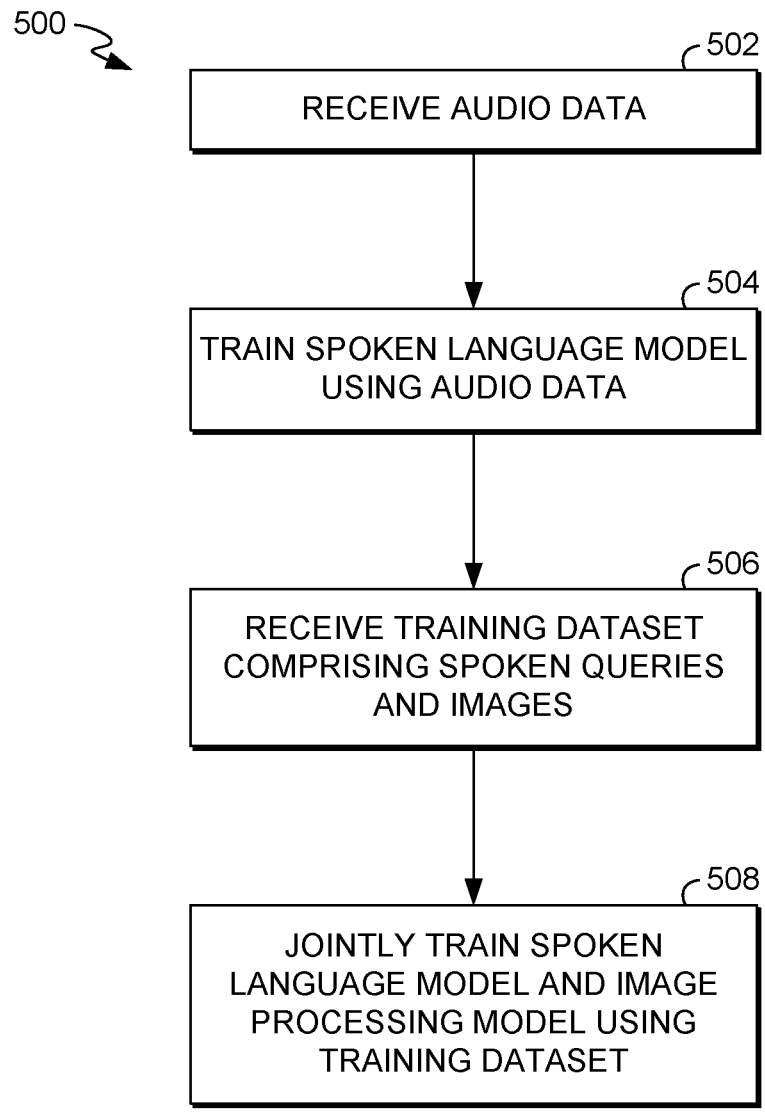
FIG. 5 is a flow diagram showing a method for training a multi-modal model comprising a spoken language model and an image processing model in accordance with some implementations of the present disclosure.

With reference now to FIG. 5, a flow diagram is provided that illustrates a method 500 for training a multi-modal model comprising a spoken language model and an image processing model. The method 500 can be performed, for instance, by the image search system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, a system performing the method 500 receives audio data. The audio data comprises speech signals from user utterances. For instance, the audio data can comprise spoken queries submitted by users to a search system. However, it should be understood that the audio data is not necessarily spoken queries and can be other forms of spoken language from a person. At block 504, the system performing the method 500 trains a spoken language model of a multi-modal model using the audio data. In particular, the spoken language is trained to extract acoustic and language features from speech signals of the audio data. In some instances, the spoken language model comprises a sequence of neural network models that are trained using a curriculum approach in which at least one model of the spoken language model is trained, followed by training at least one other model from output of the initially trained model(s). For instance, the spoken language model can be trained using the method 600 described below with reference to FIG. 6

The system implementing the method 500 receives a training dataset, as shown at block 506. The training dataset comprises a number of spoken queries and one or more images associated with each spoken query. In some aspects, each image associated with a spoken query is a positive example or a negative example. A positive example is an image that is relevant to the spoken query (e.g., goal relevance of 1), while a negative example is an image that is not relevant to the spoken query (e.g., goal relevance of 0). In some cases, the spoken queries are from historical search sessions. That is, the spoken queries are spoken queries submitted by users to a search system. In some cases, a positive example for a spoken query comprises an image associated with a search result returned in response to the spoken query with which the user interacted. In some cases, a negative example for a spoken query comprises an image not associated with a search result returned in response to the spoken query with which the user interacted.

As shown at block 508, the system implementing the method 500 jointly trains the spoken language model and an image processing model of the multi-modal model using the training dataset. The spoken language model and image processing model are jointly trained over a number of epochs. At each epoch, a spoken query is provided as input to the spoken language model that extracts features from the spoken query, and an image associated with the spoken query (e.g., a positive example or a negative example) is provided as input to the language processing model that extracts features from the image. A predicted relevance score is generated by the multi-modal model based on extracted features, and parameters of the spoken language model and image processing model are updated (e.g., by backpropagation).

Figure 6:
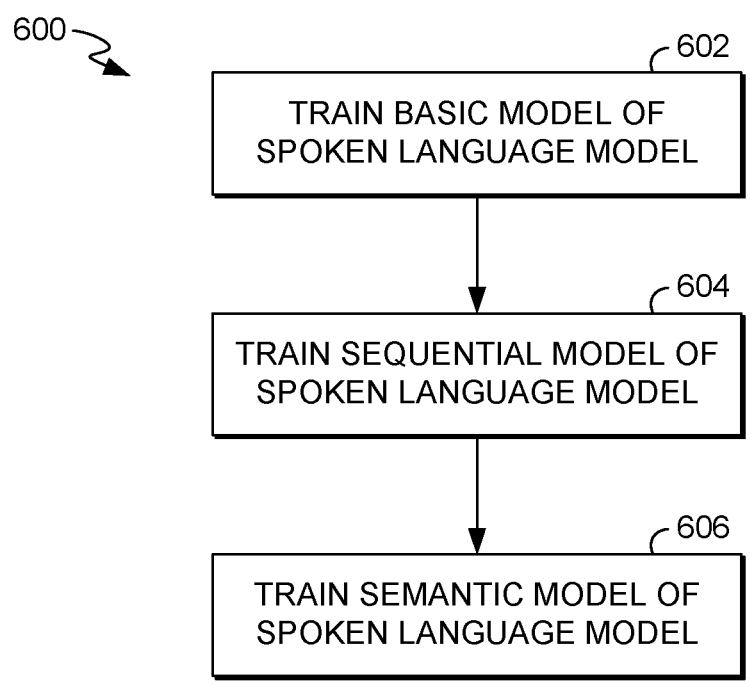
FIG. 6 is a flow diagram showing a method for training a spoken language model for a multi-modal model in accordance with some implementations of the present disclosure.

Turning next to FIG. 6, a flow diagram is provided showing a method 600 for training a spoken language model for a multi-modal model. The method 600 can be performed, for instance, by the image search system 104 of FIG. 1. As shown at block 602, the system implementing the method 600 trains a basic model of the spoken language model on audio data to learn sequences of representations of characters from speech signals in the audio data. The training of the basic model includes updating parameters (e.g., weights) of the basic model over a number of epochs.

As shown at block 604, the system implementing the method 600 trains a sequential model of the spoken language model to learn tokens from the sequences of representations of characters from the basic model. The training of the sequential model includes updating parameters (e.g., weights) of the sequential model over a number of epochs. When training the sequential model, the parameters of the basic model are initialized based on the parameters learned from training the basic model at block 602. In some cases, the parameters of the basic model are fixed while training the sequential model. In other cases, the parameters of the basic model are updated while training the sequential model.

As shown at block 606, the system implementing the method 600 trains a semantic model of the spoken language model to learn semantic information from the tokens from the sequential model. The training of the semantic model includes updating parameters (e.g., weights) of the semantic model over a number of epochs. While training the semantic model, the parameters of the basic model and the sequential model are initialized based on the parameters learned from training at blocks 602 and/or 604. In some cases, the parameters of the basic model and/or the sequential model are fixed while training the semantic model. In other cases, the parameters of the basic model and/or the sequential model are updated while training the semantic model.

Figure 7:
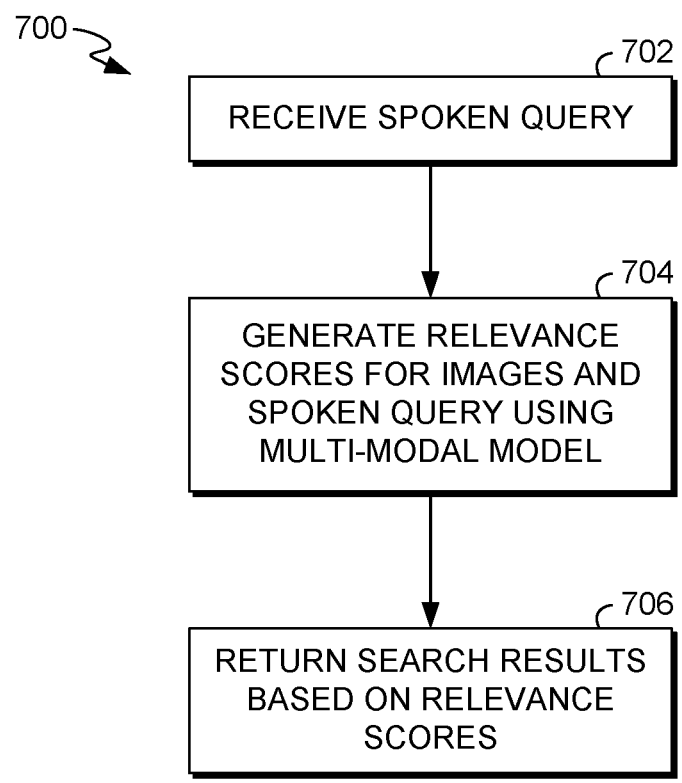
FIG. 7 is a flow diagram showing a method for generating search results for a spoken query using a multi-modal model in accordance with some implementations of the present disclosure.

FIG. 7 is a flow diagram showing a method 700 for generating search results for a spoken query using a multi-modal model. The method 700 can be performed, for instance, by the image search system 104 of FIG. 1. As shown at block 702, the system implementing the method 700 receives a spoken query input by a user. Based on the spoken query, the system implementing the method 700 generates relevance scores of images using a multi-modal model trained in accordance with the technology described herein. The relevance score for an image indicates a relevance of the image to the spoken query received at block 702. In some cases, a relevance score is determined for all images in a database. In other cases, a relevance score is determined for a subset of images in a database. For instance, relevance scores can be determined for images from a particular category.

The relevance score for a given image is generated at block 704 by providing the spoken query to the spoken language model of the multi-modal model and the given image to the image processing model of the multi-modal model. The spoken language model extracts features from the spoken query, and the image processing model extracts features from the given image. Those features are used by the multi-modal model to generate a relevance score for the given image, reflecting the relevance of the given image to the spoken query.

As shown at block 706, the system implementing the method 700 provides search results as a response to the spoken query based at least in part on the relevance scores determined at block 704. The search results are selected and/or ordered based on the relevance scores.

Exemplary Operating Environment

Figure 8:
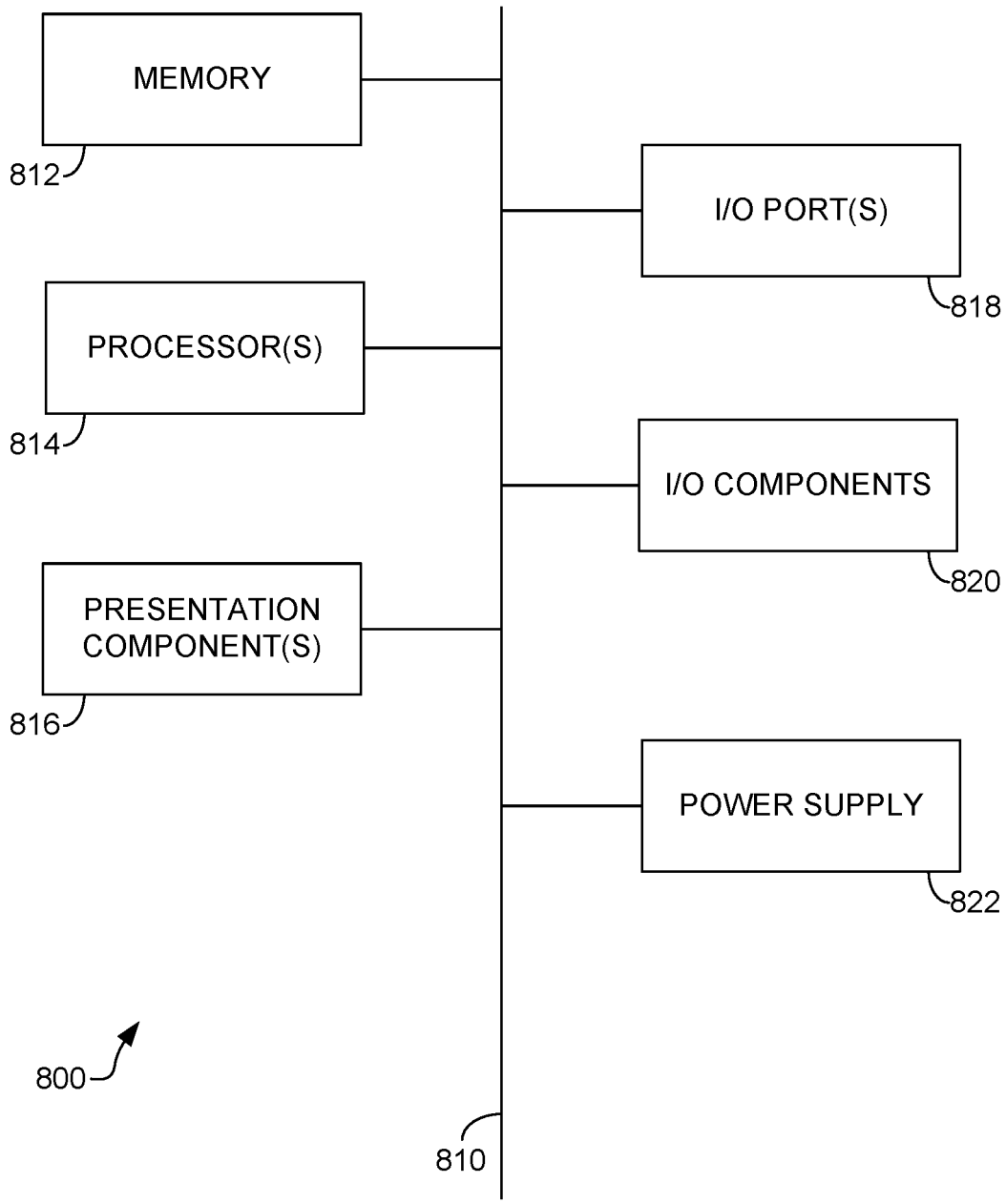
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
    training a spoken language model using audio data to provide a trained spoken language model, wherein the spoken language model comprises a first model and a second model, and wherein the spoken language model is trained by:
        in a first stage, training the first model on the audio data without training the second model, and
        in a second stage after training the first model in the first stage, combining the first model and the second model and training the second model on the audio data; and
    after training the spoken language model, jointly training, using a training dataset comprising a plurality of spoken queries and one or more images associated with each spoken query, the trained spoken language model and an image processing model to provide a multimodal model comprising a retrained spoken language model and a trained image processing model that generate a relevance score for an input spoken query processed by the retrained spoken language model and an input image processed by the trained image processing model.

2. The one or more computer storage media of claim 1, wherein the first model generates a sequence of representations of characters from a speech signal, and the second model generates tokens from the sequence of representations of characters.

3. The one or more computer storage media of claim 2, wherein the spoken language model further comprises a third model that generates semantic information from the tokens.

4. The one or more computer storage media of claim 3, wherein training the spoken language model using the audio data to provide the trained spoken language model further comprises:
    in a third training stage after the second training stage, combining the third model with the first model and the second model and training the third model using the audio data to provide the trained spoken language model.

5. The one or more computer storage media of claim 4, wherein in the second training stage, the first model is retrained while training the second model.

6. The one or more computer storage media of claim 4, where in the third training stage, the first model and the second model are retrained while training the third model.

7. The one or more computer storage media of claim 1, wherein the one or more images for a first spoken query in the training dataset comprises a positive example and a negative example, the positive example comprising an image associated with a search result for the first spoken query with which a user interacted, the negative example comprising an image not associated with a search result for the first spoken query with which the user interacted.

8. The one or more computer storage media of claim 1, wherein the trained spoken language model comprises parameters learned from training the spoken language model, and wherein jointly training the trained spoken language model and the image processing model comprises learning adjusted parameters of the trained spoken language model to provide the retrained spoken language model while learning parameters of the image processing model to provide the trained image processing model.

9. The one or more computer storage media of claim 1, wherein the operations further comprise:
ordering at least a portion of the spoken queries in the training dataset based on length and wherein the trained spoken language model and the image processing model are jointly trained over a plurality of epochs in which the at least the portion of the spoken queries are used for training in accordance with the ordering.

10. The one or more computer storage media of claim 1, wherein jointly training the trained spoken language model and the image processing model comprises:
a first plurality of epochs in which the trained spoken language model and the image processing model are trained using a first subset of the spoken queries that each have a length below a length threshold; and
a second plurality of epochs following the first plurality of epochs in which the trained spoken language model and the image processing model are trained using a second subset of the spoken queries that each have a length above the length threshold.

11. A computer-implemented method comprising:
receiving, by a user interface component, a spoken query;
generating, by a multi-modal model comprising a spoken language model and an image processing model, a relevance score for an image and the spoken query, the multi-modal model trained using a curriculum learning process that includes:
(1) initially training the spoken language model using audio data, wherein the spoken language model comprises a first model and a second model, and wherein initially training the spoken language model includes training the first model in a first stage and subsequently training the second model in a second stage, followed by
(2) jointly retraining the spoken language model and training the image processing model using a training dataset comprising a plurality of spoken queries and one or more images associated with each spoken query; and
providing, by the user interface component, one or more search results in response to the spoken query based at least in part on the relevance score.

12. The computer-implemented method of claim 11, wherein the first model generates representations of characters from a speech signal, and the second model generates tokens from the representations of characters.

13. The computer-implemented method of claim 11, wherein the first model is retrained while training the second model in the second stage.

14. A computer system comprising:
a processor; and
a computer storage medium storing computer-useable instructions that, when used by the processor, causes the computer system to perform operations comprising:
training, by a spoken language model training component, a spoken language model using audio data to provide a trained spoken language model, the spoken language model comprising a first model and a second model, the training of the spoken language model comprising:
training the first model in a first stage, and
training the second model in a second stage following the first stage; and
after training the spoken language model, jointly training, by a joint model training component, a multi-modal model comprising the trained spoken language model and an image processing model to produce a trained multi-modal model comprising a retrained spoken language model and a trained image processing model that generate a relevance score for an input spoken query processed by the retrained spoken language model and an input image processed by the trained image processing model.

15. The computer system of claim 14, wherein the multi-modal model is trained using a training dataset comprising a plurality of spoken queries and one or more images associated with each spoken query.

16. The computer system of claim 15, wherein the one or more images associated with a first spoken query in the training dataset comprise a positive example and a negative example, the positive example comprising an image associated with a search result for the first spoken query with which a user interacted, the negative example comprising an image not associated with a search result for the first spoken query with which the user interacted.

17. The computer system of claim 15, wherein the first model of the spoken language model generates a sequence of representations of characters from a speech signal, and wherein the second model of the spoken language model generates tokens from the sequence of the representations of characters.

18. The computer system of claim 17, wherein the spoken language model further comprises a third model that generates semantic information from the tokens.

19. The computer system of claim 17, wherein the training of the spoken language model further comprises:
training the third model in a third stage subsequent to the second stage.

* * * * *